United States Patent [19]

Melen

[11] Patent Number: 5,048,011

[45] Date of Patent: Sep. 10, 1991

[54] ROUTING METHOD FOR FAST PACKET SWITCHING SYSTEMS

[75] Inventor: Riccardo Melen, Turin, Italy

[73] Assignee: CSELT - Centro Studi E Laboratori Telecomunicazioni S.p.a., Turin, Italy

[21] Appl. No.: 338,958

[22] Filed: Apr. 14, 1989

[30] Foreign Application Priority Data

May 24, 1988 [IT] Italy ................................ 67474 A/88

[51] Int. Cl.$^5$ .......................................... H04Q 11/04
[52] U.S. Cl. ........................................ 370/60; 370/54; 340/826
[58] Field of Search ...................... 370/60, 60.1, 94.1, 370/94.2, 94.3, 54, 16; 340/825.03, 826

[56] References Cited

U.S. PATENT DOCUMENTS

| | | | |
|---|---|---|---|
| 4,630,260 | 12/1986 | Toy et al. | 370/94.1 |
| 4,656,622 | 4/1987 | Lea | 370/16 |
| 4,870,639 | 9/1989 | Hayashi et al. | 370/60 |
| 4,873,517 | 10/1989 | Baratz et al. | 340/825.03 |
| 4,907,220 | 3/1990 | Rau et al. | 370/94.1 |

Primary Examiner—Douglas W. Olms
Assistant Examiner—H. Kizou
Attorney, Agent, or Firm—Herbert Dubno

[57] ABSTRACT

A fast packet switching system has an interconnection network associated with a distributed control structure composed of a plurality of processing units (UC1-1 . . . UC3-16) managing the routing at the virtual call level. At least some processing units each associated with a group of network inputs/outputs store bandwidth occupancy data relevant to the interstage links which can be reached from the inputs of the group and are included between the inputs and a central network stage where there is a maximum number of alternative paths or, respectively, bandwidth occupancy data relevant to interstage links which lead to the outputs of the group and are included between the stage and the output, the data being updated whenever a new call is routed. When a virtual call is to be routed, the processing units associated with the input or respectively the output involved in the connection, evaluate a cost function of the connection along the portion of each of the possible routing paths included between the input and the stage where there is the maximum number of alternative paths, or for the portion of each routing path included between such stage and the output. The results of the evaluations carried out by these units are combined in one of the units which determined a global cost function for the individual connection paths and forwards the call on the path presenting the minimum cost function.

6 Claims, 1 Drawing Sheet

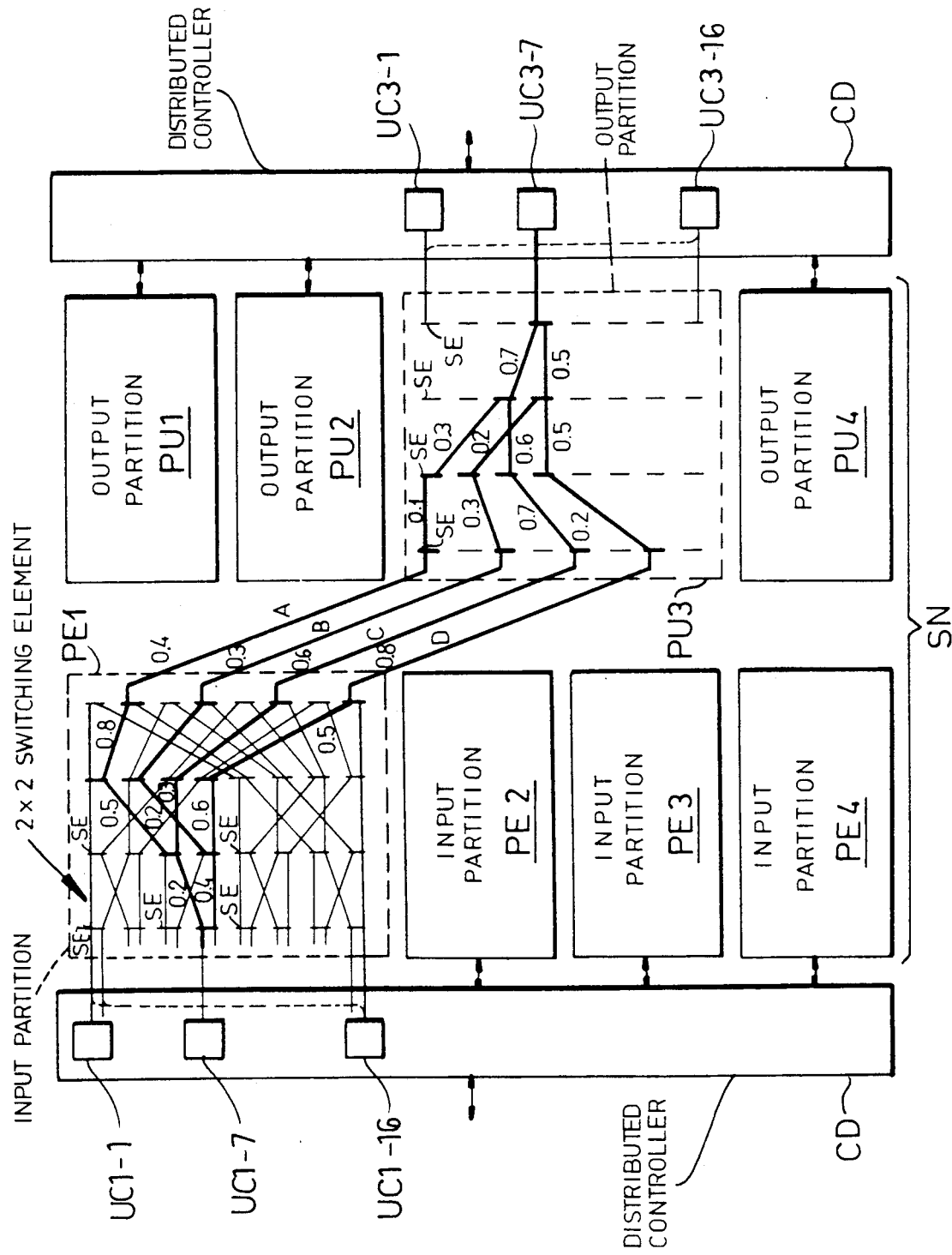

ROUTING METHOD FOR FAST PACKET SWITCHING SYSTEMS

FIELD OF THE INVENTION

The present invention refers to fast packet switching telecommunications systems, and, more particularly, to a routing method for an interconnection network in one such system and the system which utilizes a method.

BACKGROUND OF THE INVENTION

Fast packet switching (known also as labelled packet switching or asynchronous time division switching) is a technique recently proposed for switching speech, data and video signals. According to this technique, information blocks, which are associated with a label characterizing the information and asynchronously arriving at the switching devices, are switched solely on the basis of the contents of such a label. Owing to protocol simplicity, this technique offers considerable performance improvements as to information processing rates and flexibility, as compared with conventional packet switching.

A switching exchange for a system employing such technique generally comprises an interconnection network composed of a plurality of identical elements combined into a certain number of successive stages, and a control structure. Depending on network size, user and/or system manager requirements, traffic characteristics, etc., different traffic distribution modalities as well as different embodiments of the interconnection network and the control structure are possible.

More particularly:

Traffic can be distributed at packet level (i.e. each packet follows its individual path independently of the other packets relevant to the same communication) or at virtual call level. In this case each virtual call is assigned a path through the network and hence all packets relevant to said call follow the same path.

The interconnection network can afford a single path or a plurality of alternative paths between an input and an output;

The control can be either a centralized control, in which a single unit controls all the node input/output lines and has at disposal all of the information necessary to forward the packets, or a distributed control. In the latter case a plurality of controllers are provided, each managing the traffic as to a certain group of input/output lines.

The present invention is applicable to distributed control networks, where a multiplicity of paths are available between an input and an output and traffic is distributed at the virtual call level. In a network of this kind, for each call to be switched the problem arises of choosing the best connection path between input and output, i.e. the path which optimizes certain predetermined parameters.

More particularly reference is often made to optimizing a "cost function" of the connection. The term "cost function" means a parameter related to bandwidth occupancy on the connection. Such parameter can be defined in various ways, depending on the characteristics of the switching elements forming the network.

A solution to this problem is described by M. De Pricker and M. De Somer in the paper entitled "Performance of a Service Independent Switching Network with Distributed Control", IEEE Journal on Selected Areas in Communication, Vol SAC-5, No. 8, October 1987. In this method, which can be applied to a network in which an output can be reached from an input via any central stage, a control packet is sent into the network to find a connection path between the desired input and output, which path is capable of guaranteeing an acceptable service quality. This path is looked for step-by-step, by using at each stage a local control function of the load of the stage output involved. More particularly, the load (as percentage of the occupied bandwidth as compared with the available bandwidth) due to the communications using at that instant that output is memorized in each switching element, and a check is made as to whether the additional load due to the new communication can be accepted, i.e. it does not lead to too high a queue overflow probability. If the control packet reaches the network output, the path thus found is then used for routing all packets of the same virtual communication.

This known method has the disadvantage that, due to the high number of alternative paths available between an input and an output, in order to find a routing path within a reasonable time without resorting to extremely complex evaluating algorithms, the path between adjacent stages is optimized but there is no global network vision, so that the path finally found is not necessarily the one which optimizes the global "cost function" of the new connection.

OBJECT OF THE INVENTION

The object of the present invention is to provide a method wherein a global cost function is evaluated, without burdening the control devices with an excessive processing load thereby finding a path which is actually the optimal path between the network input and output.

SUMMARY OF THE INVENTION

The method provided by the invention for the routing of packets through an interconnection network of a fast packet switching system, in which the interconnection network is associated with a distributed control structure composed of a plurality of processing units which manage the routing at the virtual call level, is characterized in that at least some of said processing units, associated each with a group of network inputs/outputs, store bandwidth occupancy data of interstage links which can be reached from the inputs of said group and are included between said inputs and a stage where there is the maximum number of alternative paths, or respectively the bandwidth occupancy data of the interstage links which lead to the outputs of said group and are included between said stage and the outputs of said group, said data being updated whenever a new call is routed, and in that, when a virtual call is to be routed, the processing units associated with the input or respectively the output involved in the connection evaluate each, on the basis of the updated condition of bandwidth occupancy and of the bandwidth requirements of the new call, a cost function of the connection for the portion of each possible routing path included between the input and the stage where there is the maximum number of alternative paths or respectively for the portion of each routing path included between such stage and the output, the results of the evaluations carried out by said units being combined together in one of the units, which determines a global cost function of the individual connection paths and forwards the call on the path which presents the minimum cost function.

The invention provides also a fast packet switching communications system, wherein at least some processing units, associated each with a group of network inputs/outputs, are capable of storing and updating at each new call being routed bandwidth occupancy data concerning interstage links which can be reached from the inputs of said group and are included between said inputs and a stage where there is the maximum of alternative paths or respectively bandwidth occupancy data concerning the links leading to the outputs of said group and included between said stage and the outputs. When a virtual call is to be routed, the processing units associated respectively with the input and output involved in the connection comprise means to evaluate, on the basis of the updated bandwidth occupancy condition and of the bandwidth requirements of the new call, a cost function of the connection for the portion of each of the possible routing paths included between the input and a stage where there is the maximum of alternative paths or respectively for the portion of each routing path included between such stage and the output, one of said units receiving from the other unit the results of the evaluations carried out, combining them with its own results to evaluate the global cost function of the connection and routing the call on the path which presents the minimum cost function.

The routing method provided by the invention and the communications system to which it is applied present further advantages in addition to that deriving from the choice of the optimum routing path made on the basis of a global network vision. More particularly, the fact that the processing units which evaluate the cost function must control only some of the links reduces processing times. Besides, sharing the memory of the link bandwidth occupancy among a plurality of processing units allows routing operations between inputs/outputs belonging to different groups to be carried out concurrently, thereby further improving network performance as far as traffic handling is concerned.

BRIEF DESCRIPTION OF THE DRAWING

The above and other objects, features and advantages of the present invention will become more readily apparent from the following description, reference being made to the accompanying drawing, the sole FIGURE of which is a block diagram of a fast packet switching interconnection network according to the invention.

SPECIFIC DESCRIPTION

The Figure shows by way of example a 64-input, 64-output interconnection network composed of 2×2 switching elements SE, arranged in 8 stages. The structure of the switching elements can be as described by C. Demichelis, G. Giandonato, S. Giorcelli and R. Melen in the paper entitled "Fast packet switching technique in first generation ISDN", CSELT Technical Reports, Vol. XV, No. June 1987 (See U.S. Pat. No. 4,890,281). The network described here presents two additional stages (i.e. two stages more than the minimum number necessary to allow connection between any input and any output) and offers the availability of four alternative paths between a given input and a given output. Besides, the network inputs/outputs are grouped into four input partitions PE1 ... PE4 and four output partitions PU1 ... PU4, comprising each each having 16 inputs or outputs, respectively, and including elements SE forming the first four and the last four stages of the network, respectively. Elements SE are schematically represented only for one input partition, e.g. PE1, and for one output partition, e.g. PU3. The connections between the various elements are shown only in PE1 and partly in PU3.

A distributed control structure CD, having the usual tasks of processing the packets received at the node for routing them through the interconnection network and forwarding them to the subsequent node, is provided at the network periphery. Network CD is made e.g. by units whose structure and functions can be as described in the above-mentioned paper (see also the allowed copending application Ser. No. 07/397,123 filed Aug. 22, 1989 and based upon Italian Application 67924-A/88 filed Oct. 17, 1988). Some control networks units, connected to inputs of partition PE1 or to outputs of partition PU3, have been individually represented. Such units have been denoted by UC1-1 ... UC1-7 ... UC1-16, and UC3-1 ... UC3-7 ... UC3-16. It is worth remembering that, even though the control network is shown as being divided into two parts, connected to the inputs and outputs of the interconnection network, respectively, a single unit UC controls an input and an output of the network, as clearly depicted in FIG. 2 of the above paper.

A group of units UC is also to search for the optimal routing according to the modalities demanded by the invention. To this end the units UC have to memorize the bandwidth occupancy degree of the interstage connections which can be seized by calls involving the input/output controlled by said units and to evaluate, on the basis of the current occupancy degree and the bandwidth requirements of the new call, a global "cost function" of the connection between input and output according to each of the possible alternative paths available in the network. The communication will be forwarded onto the path which minimizes the cost function chosen.

The cost function can be evaluated in terms of link occupancy, or in terms of packet delays, etc. The choice of the cost function will generally depend on the structure of the network and the switching elements it is composed of. Different cost functions can lead to different routing choices; of course, the function to be evaluated for a specific network is predetermined.

The units of said group carry out the above tasks for the path portion lying within the partition they are associated with, or, in general, for the path portion included between the input and the stage where there is the maximum number of alternative paths or between said stage and the network output, respectively. Since the maximum number of alternative paths is found in correspondence with the or a central network stage, there is a good distribution of the load between the two control units involved (of course, provided the input and output are not controlled by a one and the same unit).

The number of units UC enabled to carry out such functions depends of course on the network size. In the example shown in the Figure, the functions required by the invention are carried out by one unit for each partition, which unit is connected to all inputs/outputs of the partition itself. E.g., in the drawing, the units entrusted with the functions required by the invention are UC1-16, UC3-16 and the corresponding units (not shown) of the other partitions. To carry out such functions, these units simply need a table of bandwidth occupancy data and an arithmetic unit, capable of executing the usual mathematical operations and recognizing the minimum in a certain group of values. The memories and the arithmetic unit of the conventional microprocessors by which conventional distributed control units are implemented can be used for this purpose.

To better disclose the invention, the case will be investigated in which a connection is to be established between the input connected to control element UC1-7 and the output connected to element UC3-7. Thick lines A, B, C, D in the Figure show the four possible alternative paths between input and output; alongside each seizable interstage link there is indicated a hypothetical bandwidth occupancy situation at the instant of the routing request for the new communication. The bandwidth occupancy values are related to the maximum available bandwidth, assumed equal to 1. The new communication is assumed to increase the bandwidth occupancy by 0.1. However, in the drawing, the numbers given show the state at the time of arrival of the new call and do not include the occupancy contribution of 0.1 by the new call.

Two possible cost functions of a connection will be examined. The first function leads to the choice of the path introducing the minimum delay in the queue of packets to be forwarded through the network, while the second leads to the choice of the path which allows maximum exploitation of the available bandwidth. The first cost function is given by $\Sigma\ 1/(1-Boc)$, where Boc denotes the occupied bandwidth of an interstage link. It is to be kept in mind that in a system with queues and a certain maximum bandwidth availability $B=1$, the delay can be represented by a curve which, as bandwidth occupancy increases, has the same behavior as function $1/(1-Boc)$. The second cost function is given by $\pi\ (1-Boc)$, whose minimum clearly corresponds to maximum occupancy. Both summations include the whole set of interstage links involved in a connection path.

Element UC1-16 of partition PE1 comprising the input concerned by the call evaluates a cost function of the connection up to the input of output partition PU3, i.e. up to the link between the fourth and the fifth stage; element UC3-16 of partition PU3 evaluates the cost function from the output of the fifth stage to the network output.

Examining the first cost function (adding of course the occupancy contribution of 0.1 for the new call), the computation carried out by UC1-16 for the portion of path A it controls gives a partial cost:

$$CP1A = \frac{1}{1-0.3} + \frac{1}{1-0.6} + \frac{1}{1-0.9} + \frac{1}{1-0.5} = 15.93$$

The computation executed by UC3-16 as to the remaining portion of path A gives a partial cost:

$$CP3A = \frac{1}{1-0.2} + \frac{1}{1-0.4} + \frac{1}{1-0.8} = 7.91$$

Likewise, paths B, C, D give the following partial costs:

$CP1B = 7.09 \quad CP3B = 5.93$
$CP1C = 6.75 \quad CP3C = 13.33$
$CP1D = 17.83 \quad CP3D = 6.43$ By a message sent in a usual manner through the interconnection network, UC3-16 communicates the results of its computations to UC1-16 which adds up the two partial costs relevant to the individual connection paths thus calculating the global costs, and then determines the minimum among the values found. In the example, the global costs will be $CTA1=23.84$; $CTB1=13.02$; $CTC1=20.08$; $CTD1=24.26$, respectively. As a consequence, UC1-16 will supply UC1-7 with the information necessary to route the call on path B.

If the second cost function is chosen, the global costs of the various connections are:
$CTA2=3.3$; $CTB2=3.9$; $CTC2=3.1$; $CTD2=2.8$
and the call will be routed by UC1 on path D which presents the minimum cost.

It is clear that the foregoing description has been given by way of non limiting example and that variations and modifications are possible without going out of the scope of the invention. More particularly, the considerations above apply to networks of whatever size, with switching elements having any number of inputs/outputs, provided the number of alternative paths between an input and an output of the network remains limited.

I claim:

1. A method of routing packets through an interconnection network of a fast packet switching system, in which a number of alternative connection paths between any input and any output of the interconnection network is available and the interconnection network is associated with a distributed control structure composed of a plurality of processing units which manage routing at a virtual call level, comprising the steps of:

storing at at least some of said processing units, each associated with a group of network inputs and at least some of said processing units each associated with a group of network outputs, bandwidth occupancy data of interstage links which can be reached from the inputs of said group and are included between said inputs and a stage where separate interstage links are allotted to all alternative paths or respectively bandwidth occupancy data of the interstage links leading to the outputs of said group and included between said stage and the outputs of said group;

updating said data whenever a new call is routed;

evaluating when a virtual call is to be routed by the processing units associated with the input or respectively the output involved in the connection, on the basis of the updated condition of bandwidth occupancy and of the bandwidth requirements of the new call, a cost function of the connection along the portion of each possible routing path included between the input and the stage where separate interstage links are allotted to all alternative paths or respectively for a portion of each routing path included between said stage and the respective output;

combining the results of the evaluations carried out by said units together in one of said units, thereby determining a global cost function of the individual connection paths; and forwarding the calls on the path which presents the minimum global cost function.

2. A method according to claim 1, wherein a sum of the inverses of the bandwidth available on each interstage link is calculated as cost function to determine the delay introduced by each routing path, and the call is routed along the path which presents the minimum delay.

3. A method as claimed in claim 1, characterized in that the sum of the bandwidths available on each interstage link is calculated as cost function and the call is routed on the path which minimizes the residual available bandwidth.

4. A fast packet switching system, comprising:
a plurality of switching nodes each comprising an interconnection network composed of switching elements (SE) organized into such a number of stages that a number of alternative paths between each input and each output is available, and a distributed control structure (CD) comprising a plurality of processing units (UC1-1 . . . UC3-16) which manage the routing at the virtual call level, a group of said processing units (UC1-16, UC3-16), each associated with a group of network inputs and at least a group of said processing units each associated with a group of network outputs, memorize and update at each new routed call, bandwidth occupancy data of interstage links which can be reached from the inputs of the respective group and are included between such inputs and a stage where separate interstage links are allotted to all alternative paths, and respectively of the links leading to the outputs of the respective group and included between said stage and the outputs, evaluating means being provided that, when a virtual call is to be routed, for the processing units associated respectively with the input and output involved in the call evaluate, on the basis of the updated bandwidth occupancy condition and of the bandwidth requirements of the new call, a partial cost function of the connection for the part of each of the possible routing paths included between the input and the stage where separate interstage links are allotted to all alternative paths or respectively for the part of each routing path included between such stage and the output, one of said units (UC1-16, UC3-16) receiving from the other unit the partial cost function, combining it with the partial cost function calculated by itself, in order to evaluate a global cost function of the connection, and routing the call on the path presenting the minimum cost function.

5. A system as claimed in claim 4 wherein the interconnection network is divided into a number of input partitions (PE1 . . . PU8), and a number of output partitions for each partition (PE1 . . . PU8) a processing unit (UC1-16, UC3-16) being provided which stores said bandwidth occupancy data and evaluates said partial cost function at least for the interstage links included in the respective partition.

6. A system as claimed in claim 5 wherein the processing unit (UC1-16) associated with an input partition (PE) evaluates the partial cost function up to a first stage of the output partition (PU) and receives from the processing unit associated with the latter the partial cost functions relevant to the connection portions included in the output partition.

* * * * *